US010404566B2

(12) United States Patent
Gomez-Uribe

(10) Patent No.: US 10,404,566 B2
(45) Date of Patent: Sep. 3, 2019

(54) ONLINE TECHNIQUES FOR PARAMETER MEAN AND VARIANCE ESTIMATION IN DYNAMIC REGRESSION MODELS

(71) Applicant: NETFLIX, INC., Los Gatos, CA (US)

(72) Inventor: Carlos A. Gomez-Uribe, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 282 days.

(21) Appl. No.: 15/268,131

(22) Filed: Sep. 16, 2016

(65) Prior Publication Data

US 2017/0264521 A1 Sep. 14, 2017

Related U.S. Application Data

(60) Provisional application No. 62/305,443, filed on Mar. 8, 2016.

(51) Int. Cl.
*H04L 12/26* (2006.01)
*H04L 29/08* (2006.01)
*G06Q 30/02* (2012.01)

(52) U.S. Cl.
CPC ......... *H04L 43/10* (2013.01); *G06Q 30/0243* (2013.01); *H04L 67/36* (2013.01)

(58) Field of Classification Search
CPC ...... G06Q 30/0243; H04L 43/10; H04L 67/36
See application file for complete search history.

(56) References Cited

U.S. PATENT DOCUMENTS 9,171,068 B2 * 10/2015 Xu .................. G06F 16/9535
9,171,085 B2 * 10/2015 Xu .................. G06F 16/335

2009/0248494 A1 * 10/2009 Hueter .................. G06Q 10/00
   705/7.29
2010/0280755 A1 * 11/2010 Pillsbury ................ G06Q 30/02
   702/2
2013/0030907 A1 1/2013 Lyon
(Continued)

FOREIGN PATENT DOCUMENTS

WO 2012050626 A1 4/2012
WO 2013009650 A1 1/2013

OTHER PUBLICATIONS

International Search Report and Written Opinion—PCT/US2017/021371—ISA/EPO—dated May 15, 2017.

(Continued)

*Primary Examiner* — Mohamed A. Wasel
(74) *Attorney, Agent, or Firm* — FisherBroyles, LLP

(57) ABSTRACT

A system of assessing deployments in a network-based media system is provided herein. The system include a data storage system storing observation vectors, each observation vector being associated with an outcome indicator, and a processing device in communication with the data storage system to receive and store observation vectors and associated outcome indicators. The processing device performs operations including communicating with an endpoint device of a user to obtain information associated with the endpoint device; and transmitting an instance of a variable user interface to the endpoint device for presentation to the user via the endpoint device based on the stored observation vectors, the stored associated outcome indicators, and the obtained information associated with the endpoint device. Related systems and methods are also disclosed.

20 Claims, 7 Drawing Sheets

(56) References Cited

U.S. PATENT DOCUMENTS

2017/0060562 A1* 3/2017 Lopez .................. G06F 8/60
2017/0069215 A1* 3/2017 Borofsky .............. G09B 7/04
2017/0109685 A1* 4/2017 Bianchi ................ G06F 8/60
2018/0204268 A1* 7/2018 Hueter ................. G06Q 10/00

OTHER PUBLICATIONS

Djallel Bouneffouf et al., A Contextual-Bandit Algorithm for Mobile Context-Aware Recommender System, T. Huang et al. (Eds.): IPCONIP 2012, Part III, LNCS 7665, pp. 324-331.
Cameron Davidson-Pilon, "Multi-Armed Bandits," printed from website https://dataorigami.net/blogs/napkin-folding/79031811 Apr. 6, 2013.

* cited by examiner

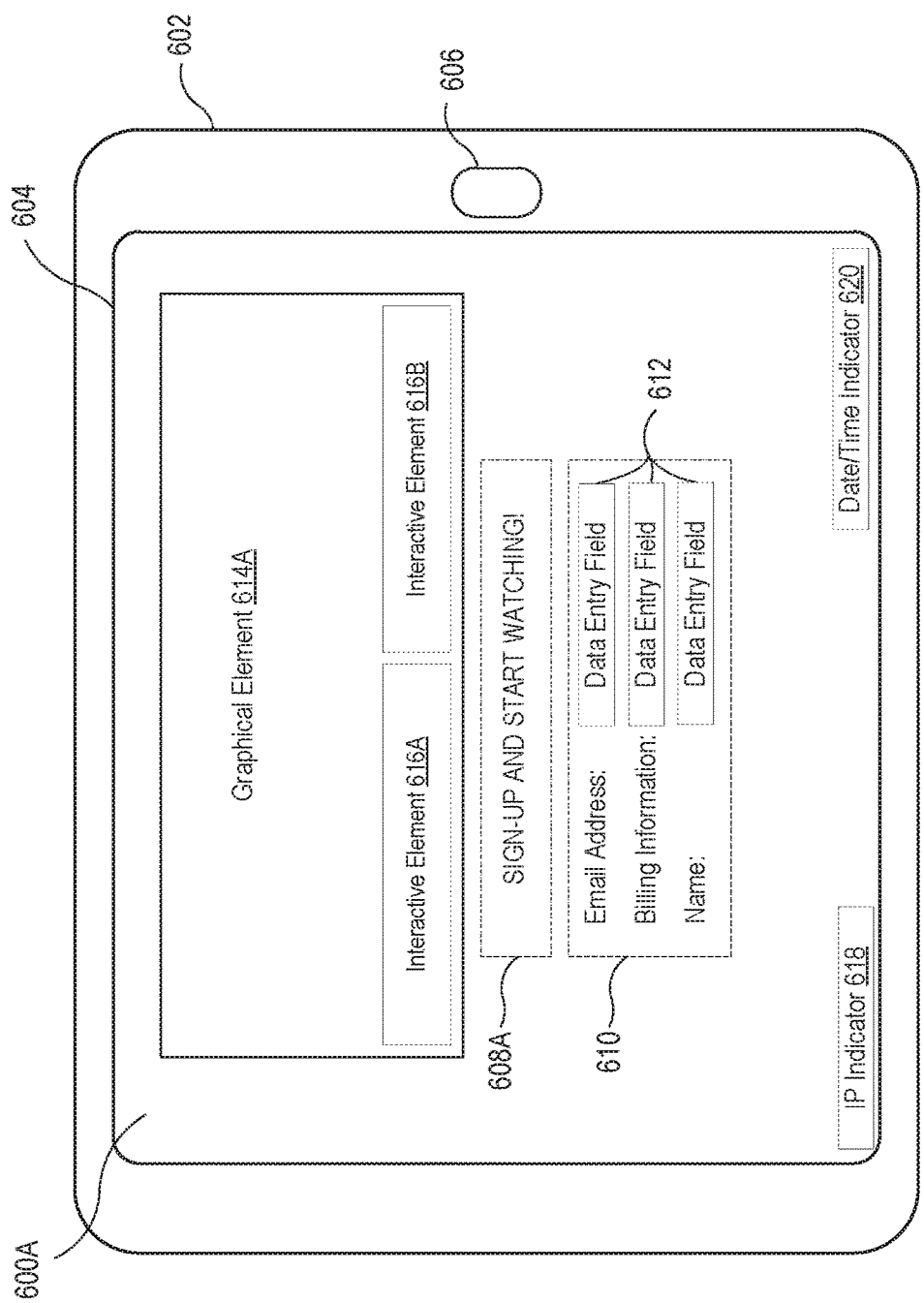

ONLINE TECHNIQUES FOR PARAMETER MEAN AND VARIANCE ESTIMATION IN DYNAMIC REGRESSION MODELS

PRIORITY INFORMATION

This application claims the benefit of U.S. Provisional Patent No. 62/305,443 filed Mar. 8, 2016 and entitled "ONLINE TECHNIQUES FOR PARAMETER MEAN AND VARIANCE ESTIMATION IN DYNAMIC REGRESSION MODELS," the disclosure of which is hereby incorporated by reference in its entirety.

TECHNICAL FIELD

The contemplated embodiments relate generally to computer science and networks, more specifically, to online techniques for parameter mean and variance estimation in dynamic regression models with a reduced computational load.

BACKGROUND

While consumers may access media items, such as movies and television shows, by receiving over the air signals by subscribing to a cable or satellite television provider, increasingly consumers are accessing more content over Internet-based media distribution systems. Some Internet-based media systems allow users to stream content over the Internet to a variety of client devices. For example, a streaming media system may provide content to users via a personal computer, a set-top box, or a personal mobile device, such as a smart phone or tablet computer. Streaming media systems enable users to access media content in a stream, such that the users may begin consuming (e.g., watching and/or listening to) content before the entirety of the content is delivered to the user's client device. Such a system allows users to access content while avoiding a potentially lengthy download process.

Such a system also allows for experimentation in the presentation of user interface elements to current and potential users. The scalability of such systems can provide large amounts of data to be collected in order to try to increase the accuracy of any prediction models to be derived from such experimentation. However, the volume of data available and needed to make accurate predictions can present a substantial computational load that is difficult or impossible to satisfy within the amount of time available for acting on such predictions.

Accordingly, the process assessing such experimental deployments in network-based distribution systems is not satisfactory in all respects.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only some embodiments of this invention and are therefore not to be considered limiting of its scope, for the invention may admit to other equally effective embodiments.

FIGS. 6A and 6B are illustrations of exemplary user interface instances displayed in an endpoint device of FIG. 4, according to various embodiments of the present disclosure.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

In network-based environments, such as Internet-based environments, is often desired to run experiments during operations in order to improve those operations. However, there are trade-offs between "exploration" of the experimental results and "exploitation" of those results in making predictions. In probability theory, this may be referred to as a multi-armed bandit scenario in which several different "arms" (options) can be selected, with each of the arms having its own probability of achieving a desired outcome or "reward."

One exemplary scenario described herein is in automatically selecting a particular instance of a plurality of user interface instances to be presented to a particular user in order to maximize the probability that that particular user will take a desired action or achieve a desired result, such as consuming a particular media item in an Internet-based media system or such as signing up or registering with an operator of the Internet-based media system. Given certain information about the user or about a device the user is employing, predictive models can be generated to make the selection of which user interface instance to present to that particular user to increase the likelihood that the user will sign up or consume the desired media item.

The present disclosure provides online algorithms, i.e. algorithms that permit the addition of new information, data, or observations to be added to the existing predictive models without reprocessing the old information, data, or observations that were used previously to generate the existing predictive models. By avoiding the reprocessing operations, embodiments of the present disclosure may improve the performance of computers when running explore/exploit processes in live operation.

References throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these words are not necessarily all referring to the same embodiment. Furthermore, the particular features, structures or characteristics may be combined in any suitable manner in one or more embodiments.

Figure 1:
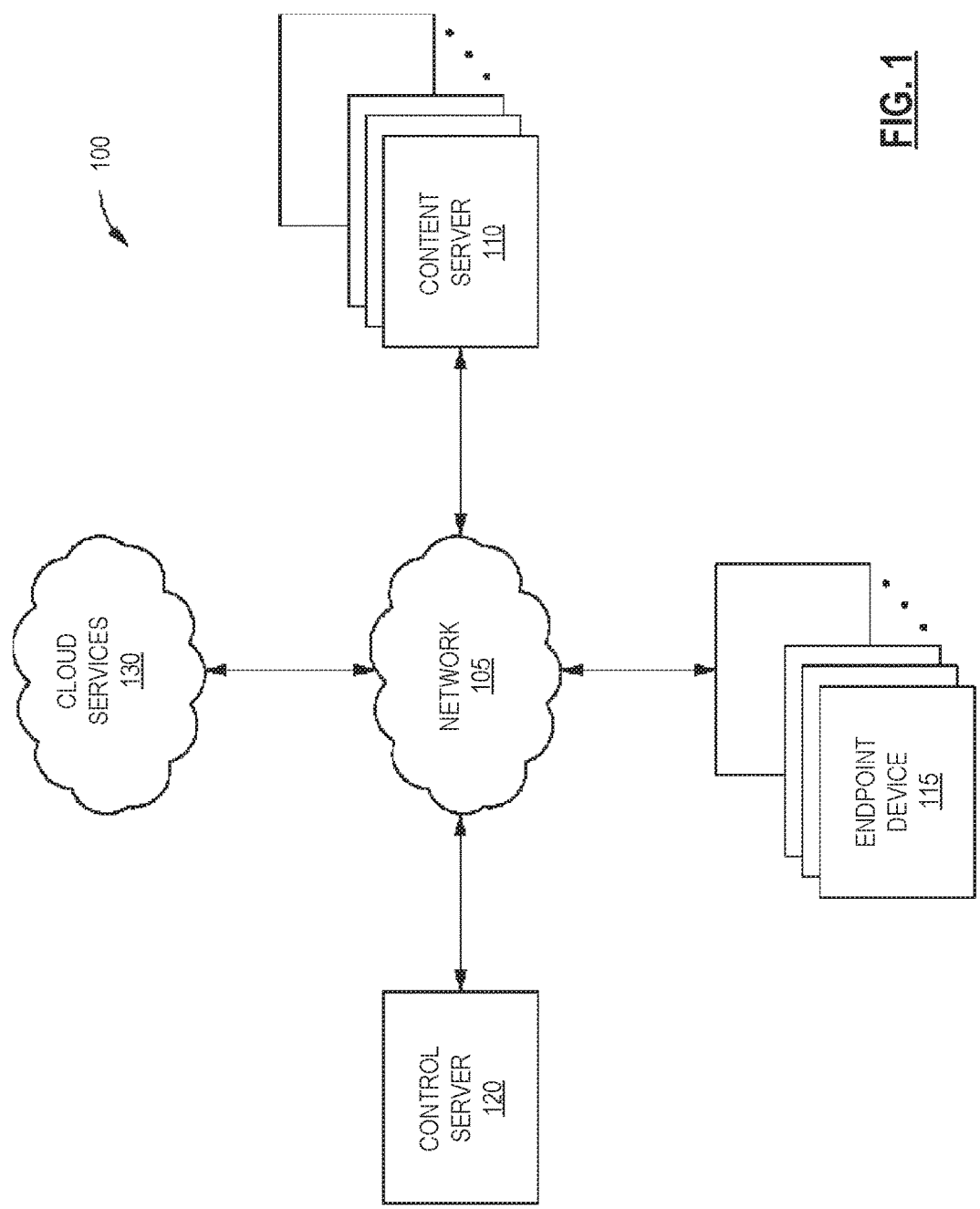
FIG. 1 illustrates a network infrastructure used to distribute content to content servers and endpoint devices, according to various embodiments of the present disclosure.

FIG. 1 illustrates a network-based media system or infrastructure 100 used to distribute content to content servers 110 and endpoint devices 115, according to various embodiments of the invention. As shown, the network infrastructure 100 includes content servers 110, control server 120, and endpoint devices 115, each of which are connected via a communications network 105.

Each endpoint device 115 communicates with one or more content servers 110 (also referred to as "caches" or "nodes") and control servers 120 via the network 105 to stream, download, or otherwise access content, such as textual data, graphical data, audio data, video data, and other types of data. In general, communications between the content servers 110, the control server 120, the endpoint devices 115, and/or cloud services 130 may be sent over the network 105, which may include one or more networks such as the Internet, a WAN, a WWAN, a WLAN, a mobile telephone network, a landline telephone network, a VoIP network, as well as other suitable networks.

The downloadable content, also referred to herein as a "media item" or a "file," is then presented to a user of an endpoint device 115 via a user interface displayed by the endpoint device. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., a Roku® set-top box or Apple TV®), and/or any other technically feasible computing platform that has network connectivity and is capable of presenting content, such as text, images, video, audio content, or other media items to a user.

Each content server 110 may include a web-server, database, and server application 217 (FIG. 2) configured to communicate with the control server 120 to determine the location and availability of various files that are tracked and managed by the control server 120. Each content server 110 may further communicate with cloud services 130 and one or more other content servers 110 in order "fill" each content server 110 with copies of various files. In some embodiments, the content servers 110 are included in the cloud services 130. In addition, content servers 110 may respond to requests for files received from endpoint devices 115. The files may then be distributed from the content servers 110 or via a broader content distribution network, which may be provided by the cloud services 130. In some embodiments, the content servers 110 enable users to authenticate (e.g., using a username and password and/or other information) in order to access files stored on the content servers 110. Although only a single control server 120 is shown in FIG. 1, in various embodiments, multiple control servers 120 may be implemented to track and manage files and to track and manage user accounts. Exemplary content servers 110 and control servers 120 may include, for example, stand-alone and enterprise-class servers operating a server operating system (OS) such as a MICROSOFT® OS, a UNIX® OS, a LINUX® OS, or another suitable server-based operating system.

In various embodiments, the cloud services 130 may include a third-party online storage service (e.g., Amazon® Simple Storage Service, Google® Cloud Storage, etc.) in which a catalog of files (e.g., media items), including thousands or millions of files, is stored and accessed in order to fill the content servers 110. Embodiments of the cloud services 130 also may provide compute or other processing services. Although only a single cloud services 130 is shown in FIG. 1, in various embodiments multiple cloud services 130 may be implemented.

Figure 2:
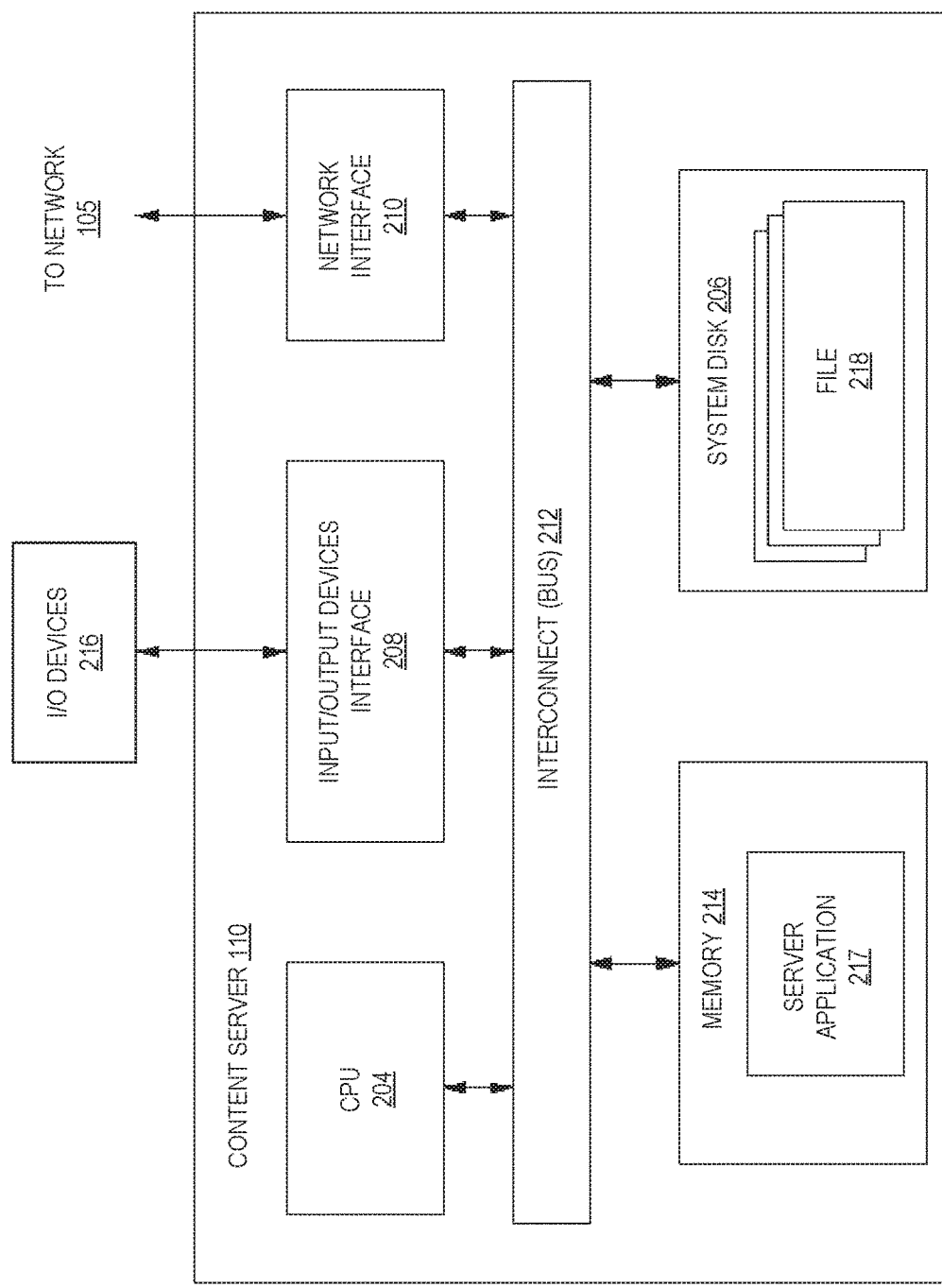
FIG. 2 is a block diagram of a content server that may be implemented in conjunction with the network infrastructure of FIG. 1, according to various embodiments of the present disclosure.

FIG. 2 is a block diagram of an exemplary content server 110 that may be implemented in conjunction with the network infrastructure 100 of FIG. 1, according to various embodiments of the present disclosure. As shown, the content server 110 includes, without limitation, a processing device or central processing unit (CPU) 204, a system disk 206, an input/output (I/O) devices interface 208, a network interface 210, a bus or interconnect 212, and a system memory 214.

The CPU 204 is configured to retrieve and execute programming instructions, such as server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 may be configured to store non-volatile data such as files 218 (e.g., audio files, video files, metadata, application files, software libraries, etc.). The files 218 can then be retrieved by one or more endpoint devices 115 via the network 105. In some embodiments, the network interface 210 is a network interface controller (NIC) configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or another content server 110 via the network 105.

Figure 3:
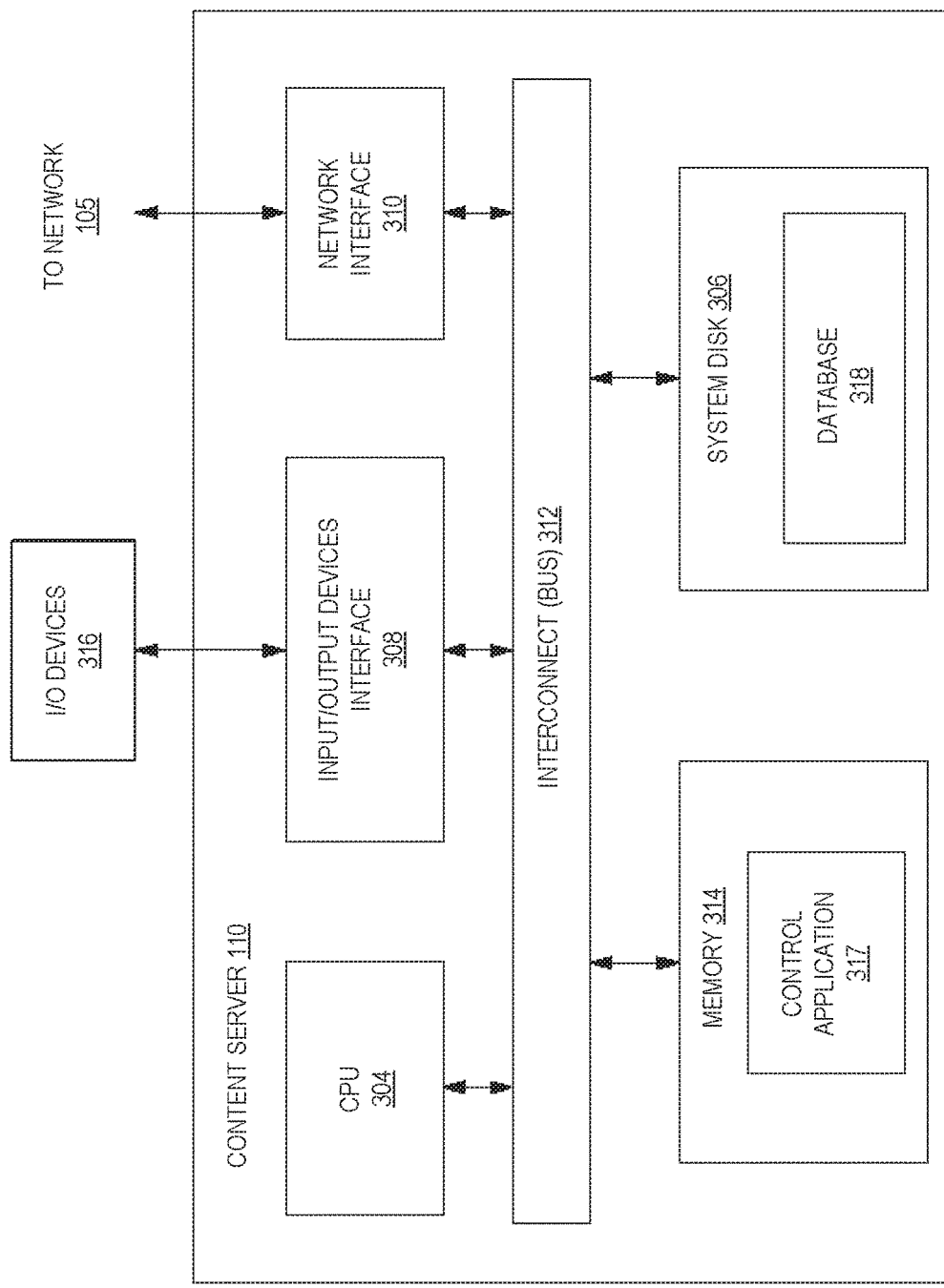
FIG. 3 is a block diagram of a control server that may be implemented in conjunction with the network infrastructure of FIG. 1, according to various embodiments of the present disclosure.

FIG. 3 is a block diagram of a control server 120 that may be implemented in conjunction with the network infrastructure 100 of FIG. 1, according to various embodiments of the present invention. As shown, the control server 120 includes, without limitation, a processing device or central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 may be configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 is configured to store a database 318 of information associated with the content servers 110, the endpoint devices 115, the cloud services 130, and the files 218.

The system memory 314 includes a control application 317 configured to access information stored in the database 318 and process the information to determine the manner in which specific files 218 will be replicated across content servers 110 included in the network infrastructure 100. The control application 317 may further be configured to receive and analyze performance characteristics associated with one or more of the content servers 110 and/or endpoint devices 115.

Figure 4:
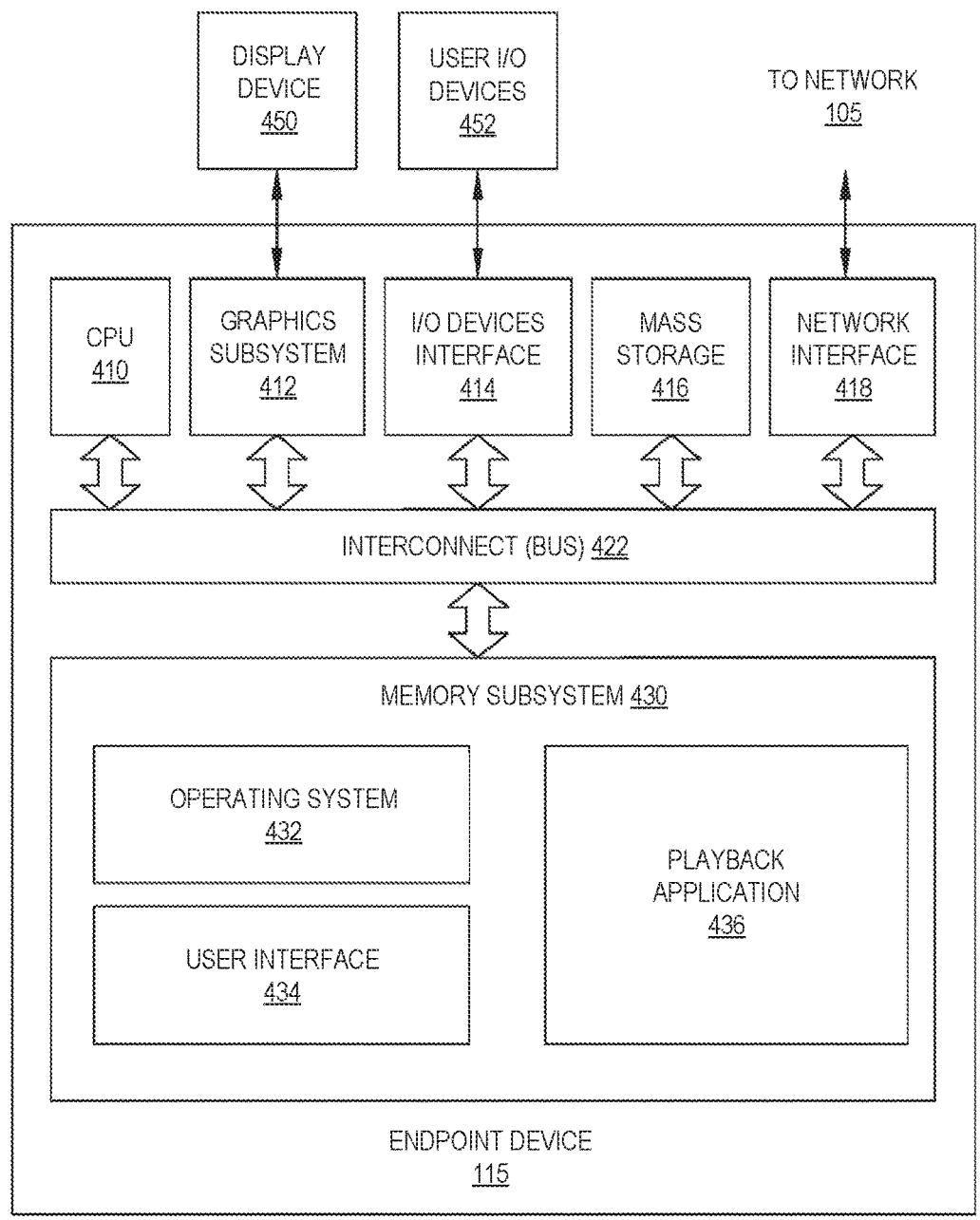
FIG. 4 is a block diagram of an endpoint device that may be implemented in conjunction with the network infrastructure of FIG. 1, according to various embodiments of the present disclosure.

FIG. 4 is a block diagram of the endpoint device 115, a client device that may be implemented in conjunction with the network infrastructure 100 of FIG. 1, according to various embodiments of the present invention. As shown, the endpoint device 115 may include, without limitation, a processing device or CPU 410, a graphics subsystem 412, an I/O device interface 414, a mass storage unit 416, a network interface 418, an interconnect 422, and a memory subsystem 430.

In some embodiments, the CPU 410 is configured to retrieve and execute programming instructions stored in the memory subsystem 430. Similarly, the CPU 410 may be configured to store and retrieve application data (e.g., software libraries) residing in the memory subsystem 430. The interconnect 422 is configured to facilitate transmission of data, such as programming instructions and application data, between the CPU 410, graphics subsystem 412, I/O devices interface 414, mass storage 416, network interface 418, and memory subsystem 430.

In some embodiments, the graphics subsystem 412 is configured to generate frames of video data from a media item and transmit the frames of video data to display device 450. In some embodiments, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray technology, and light-emitting diode (LED) display technology. An input/output (I/O) device interface 414 is configured to receive input data from user I/O devices 452 and transmit the input data to the CPU 410 via the interconnect 422. For example, user I/O devices 452 may comprise one or more buttons, a keyboard, a mouse, a touchscreen, or other pointing device. The I/O device interface 414 may also include an audio output unit configured to generate an electrical audio output signal. User I/O devices 452 may include a speaker configured to generate an acoustic output in response to the electrical audio output signal. In alternative embodiments, the display device 450 may include the speaker. A television and a smartphone are examples of devices that can display video frames and generate an acoustic output from a file.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the CPU 410 via the interconnect 422.

In some embodiments, the memory subsystem 430 includes programming instructions and application data that comprise an operating system 432, a user interface 434, and a playback application 436. The operating system 432 performs system management functions such as managing hardware devices including the network interface 418, mass storage unit 416, I/O device interface 414, and graphics subsystem 412. The operating system 432 also provides process and memory management models for the user interface 434 and the playback application 436. The user interface 434, such as a window and object metaphor, provides a mechanism for user interaction with endpoint device 115. Persons skilled in the art will recognize the various operating systems and user interfaces that are well-known in the art and suitable for incorporation into the endpoint device 115. Suitable operating systems may include iOS®, Android® OS, LINUX® OS, Firefox OS™, Windows®, OS X®, and others.

The user interface 434 and/or the playback application 436 may include device drivers, programming tools, utility programs, software libraries, application programming interfaces (APIs), and so forth. In some embodiments, the CPU 410 executes software to provide a browser, which may in turn provide for both the user interface 434 and the playback application 436. The browser may be a web browsing program such as Internet Explorer®, Chrome®, Firefox®, Safari®, etc. In other embodiments, the browser may be provided as part of a specific streaming (or downloadable) media interface provided by the operator of the control server 120. The user interface 434 may be used by user of the endpoint device 115 to register with the operator of an Internet-based or network-based media system that includes the control server 120. During such registration, the control server 120 may provide data to be displayed via the user interface 434 to encourage the user to complete registration or to complete a desired level of registration (i.e., a registration for a desired feature or account level). The endpoint device 115 may provide information to the control server 120 as part of the registration. Such information may include information specifically entered by the user, such as a name, billing information, email address, and information related to the endpoint device 115, such as the type of device, an Internet protocol (IP) address associated with the device, etc. Furthermore, the control server 120 may collect additional information that characterizes the interactions between the control server 120 and the endpoint device 115, such as a time of day of the interactions and a date of the interactions.

In some embodiments, the playback application 436 is configured to request and receive content from the content server 110 via the network interface 418. The content may be received as a file or media item that is downloaded, or the content may be partially or completely buffered in the memory subsystem 430 of the mass storage and then played. Further, the playback application 436 is configured to interpret the content and present the content via display device 450 and/or user I/O devices 452.

Figure 5:
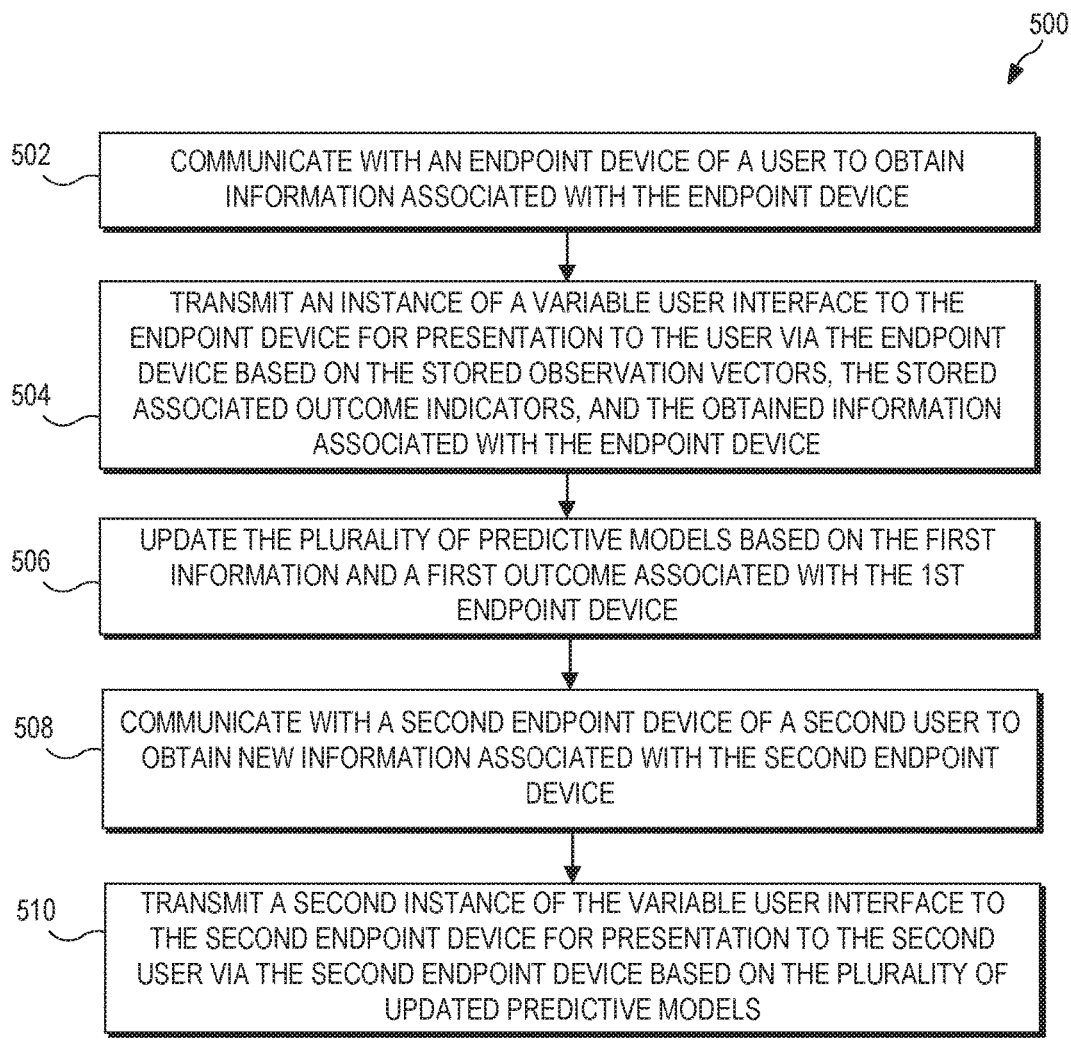
FIG. 5 is a flowchart of a method of assessing deployments in a network-based media system, according to various embodiments of the present disclosure.

FIG. 5 is a flowchart of a method 500 of assessing deployments in a network-based media system, according to various embodiments of the present disclosure. Assessable "deployments" may include interfaces associated with a sign-up or registration process, a browsing or content selection process, and/or a content playback process, etc. The method 500 is depicted as a series of enumerated steps or operations. Embodiments of the method 500 may include additional operations before, after, in between, or as part of the enumerated operations. Furthermore, some embodiments of the method 500 may omit one or more of the enumerated operations or may include alternatives thereto. Additionally, some embodiments of the method 500 may include executable instructions, stored on a computer readable medium, that cause a processing device or CPU to perform one or more associated operations.

Accordingly, some embodiments of the method 500 may begin at operation 502 in which a processing device of the server communicates with an endpoint device of a user to obtain information associated with the endpoint device. For example, the processing device of the server may be the CPU 304 of the control server 120 of FIGS. 1 and 3. The endpoint device may be the endpoint device 115 of FIGS. 1 and 4. The control server 120 and the endpoint device 115 may communicate over the network 105. During the communication between the endpoint device 115 in the control server 120, the control server 120 may collect information including, but not limited to, a type of the endpoint device 115 (e.g. an indication of whether the endpoint device 115 is a desktop or laptop computer, a smart phone, a tablet, etc.), an operating system executing on the endpoint device 115, an IP address of the endpoint device 115, an International Mobile Station Equipment Identity (IMEI) of the endpoint device, or an identifier of a browser executing on the endpoint device. The control server 120 may collect additional information, such as a time of day associated with the communications, a day of the week or date of the communications, a country in which the endpoint device 115 is operating, a country in which the control server 120 is operating, a location (such as a GPS position) of the endpoint device 115, etc. This collected information includes continuous information, such as the time of day, and discrete or categorical information, such as the day of the week.

In some embodiments, the obtained information may be assembled into an observation vector, which may be used in predictive models as described herein. For example, if a first user uses a smartphone-type endpoint device executing a Chrome® browser on an iOS® operating system and the user is located (based on a location of the endpoint device itself) in Germany to access the control server 120, the associated observation vector may be [smartphone, Chrome, iOS, Germany]. If a second user uses a desktop-type endpoint device executing a Firefox® browser on a Windows® operating system, and the user is located in Brazil, the associated observation vector may be [desktop, Firefox, Windows, Brazil]. Observation vectors may include additional information such as the IP address (or a portion of masked version of the IP address) of the endpoint device, the IP protocol version, an operating system version, a browser version, etc. Where an observation vector does not include an expected observation, such as information characterizing an operating system of the endpoint device, the observation vector may include a zero or null value for that expected piece of information. The observation vector may be assembled by the control server 120 during a series of interactions with the endpoint device. Such a series of interactions may occur during a sign-up or registration process ordering any other comparable process or interaction.

At operation 504, the processing device of the control server may transmit an instance of a variable user interface to the endpoint device for presentation to the user or operator of the endpoint device. The particular instance of the variable user interface may be based on information included in an observation vector or information that may later be included in the observation vector. For example, the particular instance of the variable user interface transmitted to an endpoint device 115 of a particular user may be based on an observation vector as follows: [smartphone, Chrome, iOS, Germany; 07:07:18; 2016-06-11], in which "07:07:18" represents the hour, minute, and second in which communication was established between the control server 120 and the endpoint device 115 and "2016-06-11" represents the day of the communications, i.e. Jun. 11, 2016. The control server 120 may transmit data to be rendered by the endpoint device 115 as a user interface or in a user interface based on any or all of the elements in the observation vector.

Figure 6B:
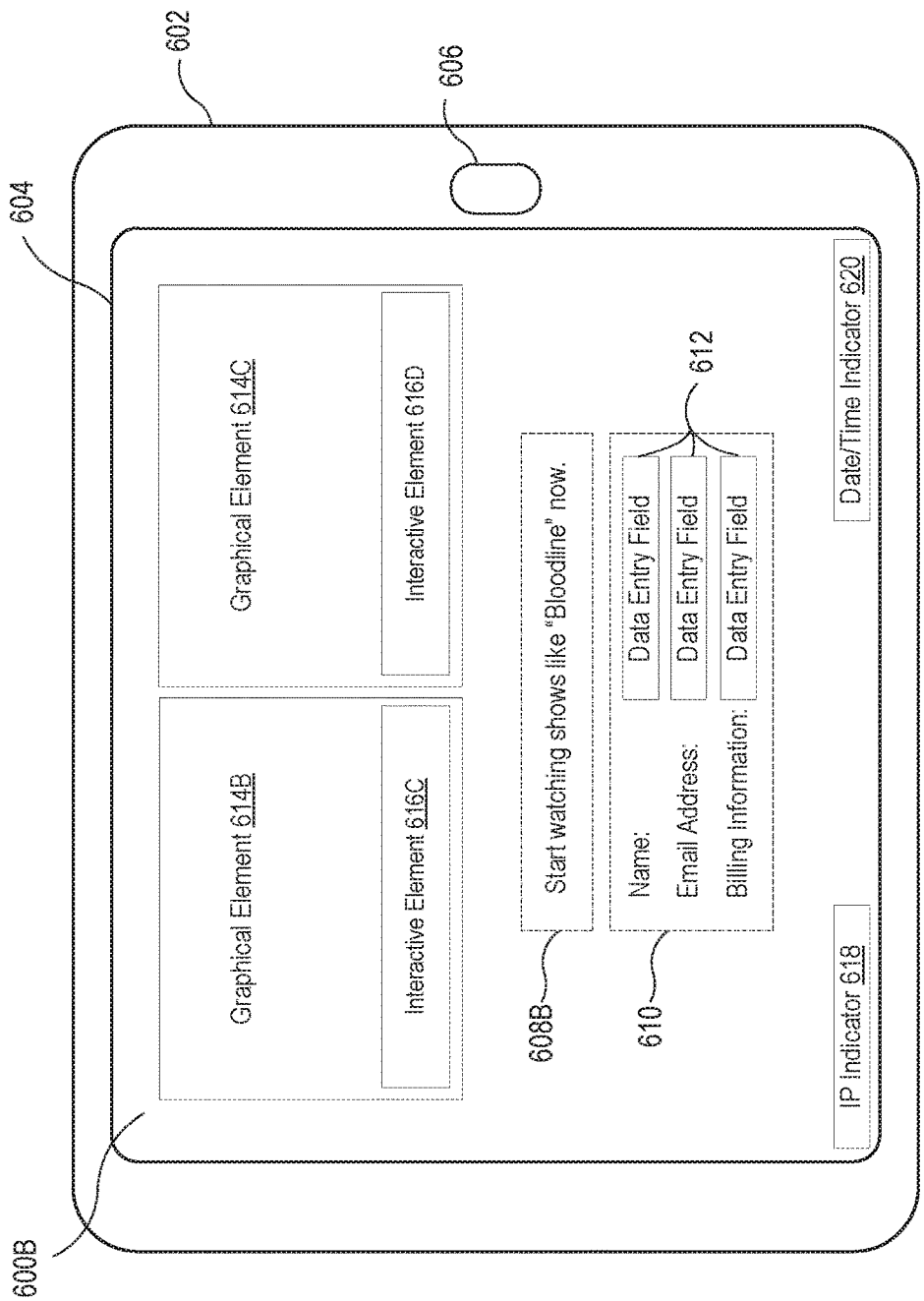

FIGS. 6A and 6B depict exemplary instances of a variable user interface 600. FIG. 6A depicts a user interface instance 600A, while FIG. 6 depicts a user interface instance 600B. Both FIGS. 6A and 6B include information rendered in a display screen 604 of a user device 602 to present a combination of interface elements from the operator of the control server 120 to a user of the user device 602. The user device 602 may be an embodiment of the endpoint device 115 of FIGS. 1 and 4. The user device 602 may include input elements, such as the button 606, which may be a mechanical button, a capacitive button, or some other input means. The user device 602 may include a touchscreen as the display screen 604 such that input may be received from one or more sensors of the user device 602. For example, a user may tap or touch on a representation of a UI element, depicted by the display screen 604 and a user interface 600, to select that element, to enter information into an entry field, or request performance of other operations.

The user interface 600 may vary in many respects, some of which may depend on the user device 602 itself and information obtained during interactions between the control server 120 and the user device 602. As illustrated in FIGS. 6A and 6B, both of the user interface instances 600A and 600B include a text prompt 608. The user interface instance 600A may include a text prompt 608A that is different from a text prompt 608B included in the user interface instance 600B. For example, the appearance of the text in the text prompts 608 may be presented in a different font, a different color, a different size, and may include different text. For example, the text prompt 608B includes a reference to a specific media item (e.g., a film, a television show or series, an audiobook, a song) that may be accessible to the user device 602 from the content server 110 of FIG. 1. Other text prompts 608 may include other text, including a reference to one or more other media items. In some instances, the control server 120 may access popularity information or ranking information associated with media items accessible via the content server 110 and select titles of high-ranking media items for inclusion in dynamically-generated text prompts 608, at the time in which the communications between the control server 120 and the user device 602 are occurring.

Both of the user interface instances 600A and 600B may include an information entry area 610. The information entry area may present a plurality of data entry fields 612. The information requested by the information entry area 610 may be different between the user interface instances 600A and 600B. As shown in FIGS. 6A and 6B, some embodiments may include requests for the same information, but assembled in a different order. As shown in FIG. 6A, the user interface instance 600A includes data entry fields 612 associated with an email address, billing information (e.g. credit card number and associated information), and a name of the user, in that order. The user interface instance 600B includes data entry fields 612 associated with a name of the user, an email address, and billing information, in that order.

Embodiments of the user interface 600 may include one or more graphical elements that are rendered in the display screen 604 to the user of the user device 602. For example, the user interface instance 600A includes a graphical element 614A, and the user interface instance 600B includes a graphical element 614B and a graphical element 614C. The graphical elements 614 may be still images, videos, text standing alone or overlaid over images or videos. In some embodiments, the graphical elements 614 may be interactive, such that a user of the user device 602 may be able to browse a catalog of media items potentially accessible from the content servers 110. The graphical elements 614 may be related to other user interface elements included in the particular instance of the user interface 600. For example, the graphical element 614B may be a still image associated with a series called "Bloodline," which is also referred to in the text prompt 608B. As depicted in FIGS. 6A and 6B, the graphical elements 614 may include one or more interactive elements 616. The graphical element 614A is associated with 2 interactive elements 616A and 616B. In the user face instance 600B, the graphical element 614B is associated with an interactive element 616C, while the graphical element 614C is associated with an interactive element 616D. The interactive elements may be a button or other selectable user interface feature that may trigger an action in the user interface 600. For example, the user of the user device 602 may touch a portion of the display screen 604 covered or defined by the interactive element 616C to request that a video be shown in the graphical element 614B. For example, the video may be a trailer and may be played in the display screen 604 upon selection of the interactive element 616C.

As illustrated, both of the user interface instances 600A and 600B may include an IP indicator 618 and a daytime indicator 620. Accordingly, some embodiments of the user interface 600 may explicitly depict the IP address associated by the controls server 120 with the user device 602 and depict an indicator of the date and time of the ongoing communications between the control server 120 and the user device 602. In other embodiments, the IP indicator 618 and day/time indicator 620 may not depicted in the user interface 600. As noted above, this information may be included in an observation vector. Additionally, information regarding the particular instance of the user interface 600 may be included in the observation vector. For example, the observation vector [smartphone, Chrome, iOS, Germany; 07:07:18; 2016-06-11] may be altered or appended to further include an indicator of the text prompt 608, the graphical element or elements 614 and the data entry fields 612. Such an observation vector may be: [smartphone, Chrome, iOS, Germany; 07:07:18; 2016-06-11; day_of_week; text_prompt_27; graphical_element_54; entry_order_02], wherein "text_prompt_27," "graphical_element_54," and "entry_order_02," represent identifiers associated with a particular text prompt, a particular graphical element, and a particular entry order selected from a plurality of potential text prompts, graphical elements, and entry orders, respectively. Other observation vectors may include other components.

Some embodiments of the user interface 600 may depict one or more of the above described user interface elements shown in a sequential order. In other words, a first screen of the user interface 600 may include only one of the data entry fields 612, while a second screen of the user interface 600 includes another of the data entry fields 612. For example, a first screen of the user interface 600 may prompt the user to enter an email address into a data entry field 612. Upon entry of a valid email address, the user interface 600 may display a second screen that prompts the user to enter billing information into another data entry field 612. While the user interface 600 is depicted as a sign up or registration interface, embodiments of the present disclosure may include other user interfaces such as user interfaces used to consume content, as one example.

Returning to FIG. 5 in the method 500, at operation 504, the processing device of the control server may transmit a particular instance of a variable user interface to the endpoint device for presentation to the user or operator of the endpoint device based on observed information. For example, the memory 314 of the control server 120 may include a plurality of stored observation vectors like those described above. These observation vectors may be stored in connection with associated outcome indicators. For example, after transmitting the user interface instance 600B to the user device 602, the user may complete registration with the operator of the content server 110 or not. The completion of registration or failure to complete registration is considered an "outcome" of the transmitting. For each scenario or observation vector, there may be tens, hundreds, or thousands of outcomes. After an outcome is determined by the control server 120, the outcome may be included as an element within the observation vector, such that completed observation vectors include information regarding many different variables and the outcome. In some embodiments, the outcome may be a binary outcome (e.g., yes or no), which may be encoded as a 1 or a 0 in the completed observation vector. In other embodiments, a default outcome (such as "did not register) may be included in an initial observation vector if a process times out or is terminated; if a particular outcome is later observed (such as "completed registration" or "billing information rejected"), the observation vector may be updated. The memory 314 may store many thousands of such observation vectors. The control server 120 may select a particular instance of a graphical user interface, like the graphical user interface 600, based on these stored observation vectors (including outcomes) and the information being obtained from the endpoint device 115, like the user device 602.

The stored observation vectors in the memory 314 may be processed by the CPU 204 to generate a predictive model or a plurality of predictive models that associate inputs (i.e., known variables included in the observation vectors) with outcomes. The predictive models enable the control server 120 to identify which instance of a variable user interface is most likely to provide a particular outcome. For example, the control server 120 may use the predictive models to select the user interface instance 600B when the known variables included in the current observation vector are [smartphone, Chrome, iOS, Germany; 07:07:18; 2016-06-11]. In some embodiments, the predictive models are accessible in the memory 314, while the stored observation vectors used to generate the existing predictive models may be stored in the database 318 in system disk 306. In this way, the observation vectors, which may include a large amount of information may be stored in a slower computer-readable medium, while the predictive models, having a smaller memory footprint, may be stored in the faster access memory 314 as part of the application server 317.

The predictive models may associate probabilities of the desired outcome with each user interface instance to direct the control server 120 and selecting the instance for transmission in operation 504. For example, given that the information obtained at operation 502 may be represented as the current observation vector [smartphone, Chrome, iOS, Germany; 07:07:18; 2016-06-11], if there are 2, 5, or 10 different instances of the variable user interface, the predictive models may provide 2, 5, or 10 probabilities of achieving the desired outcome by transmitting each different instance of the variable user interface. These probabilities may include a mean value as well as variance value or confidence value. In some embodiments, the control server 120 may select the user interface instance having the highest mean value or the user interface instance having the highest value after adding the instances mean value to an upper bound of the confidence value, referred to as an upper confidence bound. For example, if the mean value is 0.5 or 50% and the standard deviation is about 0.1 or 10% for the user interface instance 600A, and the mean value of 0.45 or 45% and the standard deviation is about 0.2 or 20% for the user interface instance 600B, then the control server 120 may select the user interface 600B for transmission to the endpoint device, based on its upper confidence bound of 0.65 or 65%. In other embodiments, the control server 120 may select the user interface 600A, based on its mean value of 0.5 or 50%.

At operation 506, after an outcome has been detected, the current observation vector may be completed to reflect aspects of the user interface instance, for example, and the detected outcome. The completed observation vector may then be used to update the plurality of predictive models, with the obtained information and the detected outcome. The updating of the predictive models may be performed by an "online" algorithm, such that previously completed observation vectors do not have to be recomputed or re-analyzed to incorporate the newly completed observation vector. Because of this, the control server 120 may generate updated predictive models each time a new observation vector becomes available. Because the new observation vector may be incorporated into existing predictive models to update them in an "online" manner, the need for processing cycles and computing power of the CPU 304 of the control server 120 may be decreased. Embodiments of the present disclosure enable the control server 120 to operate more efficiently when adding new observations. Because new observations may be added in this manner, the ability of the control server 120 to accurately determine an instance of a variable user interface that is most likely to result in a desired outcome, such as registration, may be significantly improved. These "online" aspects of the disclosure are discussed in more detail below.

At operation 508, the processing device of a control server may communicate with a second endpoint device of the second user to obtain new information associated with the second endpoint device and the second user. For example, the CPU 304 the control server 120 may communicate over the network 105 with an endpoint device 115, like the user device 602. The new information obtained by the control server 120 may be similar to that discussed in connection with operation 502. For example, the control server 120 may determine that the user device 602 is running an iOS® operating system and is executing a particular version of an application developed by the operator of the control server 120 to facilitate communication between the user device 602 and the control server 120 and the content servers 110.

Based on the communication at operation 508, at operation 510, the processor of the control server may transmit a second instance of the variable user interface to the second endpoint device for presentation to the second user via the second endpoint device. For example, the user interface instance 600A of FIG. 6A may be transmitted to another endpoint device 115. The selection of the user interface instance 600A may be based on the plurality of updated predictive models, which have been updated based on the observation vector at operation 506.

In embodiments of the method 500, each of the plurality of instances of the variable user interface may include at least one difference. For example, the text prompt 608A of the user interface instance 600A is different from the text prompt 608B of the user interface instance 600B. In some embodiments, each of the plurality of instances of the variable user interface may include multiple differences.

Some embodiments of the present disclosure include a system, such as the control server 120 of FIG. 1, for assessing deployments and a network-based media system like the infrastructure 100, also of FIG. 1. Some embodiments of the system may include means for obtaining information associated with an endpoint device in communication with the network-based media system, means for generating models associated obtained information and outcomes, means for transmitting an instance of a variable user interface to the endpoint device, wherein the instance of the variable user interface is selected from a plurality of instances of the variable user interface based on the generated models, means for determining an outcome associated with the instance of the variable user interface being transmitted to the endpoint device, the outcome and the obtained information being included in an observation vector, and means for updating the generated models based on the determined outcome without recomputing previously obtained observation vectors. In some related embodiments, the means for obtaining information associated with an endpoint device of a user may include means for obtaining information associated with another endpoint device of another user. In some other related embodiments, the means for transmitting the instance of the variable user interface to the endpoint device may include means to select another instance of the variable user interface for transmission to another endpoint device based on the updated models. Some of these means may be provided by a processor, such as the CPU 304 of control server 120 (FIG. 3), or may include executable code stored in the memory 314 cause and the related functions to be realized within the infrastructure 100.

Additionally, some embodiments of the infrastructure 100 may include algorithmic means. Examples of such algorithmic means are included in more detail in U.S. Provisional Patent No. 62/305,443 entitled "ONLINE TECHNIQUES FOR PARAMETER MEAN AND VARIANCE ESTIMATION IN DYNAMIC REGRESSION MODELS," and incorporated herein in its entirety. The algorithmic means may include online regression models that work in the contextual bandits case when the observations are multivariate and not Gaussian, and when the model parameters are allowed to be dynamic. While other contextual bandit algorithms may be employed in other embodiments, the following example utilizes Thompson sampling. Each arm may corresponds to a variant of the sign-up pages that a visitor experiences—a combination of text displayed, supporting images, language chosen, etc. The context corresponds to the visitor's type of device and/or browser, the day of week, time of day, country where the request originated, etc. Some of these predictors are continuous, such as the time of day, and others are categorical, such as the day of the week. A desired outcome may be maximizing signups by choosing the sign-up variant that is most likely to lead to a conversion or successful signup or registration given the context. Other related outcomes may be observed that may be associated with each visitor, such as the time spent on the sign-up experience, and whether they provide their email before signing up, and included in an observation vector. These other observations may also be related to the model parameters (though possibly with different context vectors), and may be used to improve the parameter estimates. So the response may be multivariate, even if the reward is based on a single entry of the response vector. Furthermore, the model parameters may drift over time, because different aspects of the services provided by the operator of the content server 120 may become more or less relevant over time, e.g., different videos in a streaming catalog may be the most compelling at a future time than at a present time.

The response may be denoted by $y_t=[y_1\ y_2\ y_3]'$, and the reward by $r(t)=y_1$. $y_1$ may be modeled through a logistic regression, with a probability of taking the value 1 of $\pi_1=1/(e^{-\lambda_1}+1)$ and variance $\pi_1(1-\pi_1)$. The two other response entries do not affect the reward, but may be used to improve the estimates of the model parameters. $y_2$ may be modeled as a linear regression with mean $\lambda_2$ and variance $\sigma^2_{y2}=1$, and y3 through another logistic regression, with mean $\pi_3=1/(e^{-\lambda_3}+1)$ and variance $\pi_3(1-\pi_3)$. The signal is $\lambda_t=[\lambda_1\lambda_2\lambda_3]'=X'_t\theta_t$. The entries of the response may be assumed to be independent of each other conditioned on the signal, so a nuisance parameter matrix $\Phi_t$ is diagonal and time-independent, with the vector $[1\ \sigma^2_{y2}\ 1]'$ as its diagonal, and the covariance matrix of the response $\Sigma_{yt}$ is diagonal with the vector $[\pi_1(1-\pi_1)\sigma^2_{y2}\ \pi_3(1-\pi_3)]'$ as its diagonal.

The context matrix $X_t(a)\in R^{k\times 3}$ for arm a may have one row for each model parameter entry and one column per response entry. Some rows may correspond to parameters shared by all arms, and others to parameters corresponding to a single arm. To construct $X_t(a)$, continuous and categorical predictors may be sampled at each round. $X_c\in R^{k1\times 3}$ may play the role of the continuous predictors, and sample each column from a zero-mean Gaussian with covariance $\Sigma_c$. The diagonal entries in $\Sigma_c$ may be sampled independently from an exponential distribution with rate of 1, and the off-diagonal entries all have a correlation of −0.1. The categorical predictor $x_d\in R^{k2}$ may be a sample from a uniform categorical distribution with $k_2$ entries, i.e., all entries in $x_d$ may be zero except for one that is set to 1. i(a) may be an indicator vector that specifies that arm a is being evaluated. The indicator vector may have A entries that are all zero except for its a-th entry which is set to 1. Letting $1_m$ be a column vector with m entries, all set to 1, the context matrix may be defined for arm a as (1)

Here ⊗ denotes the Kronecker product between two vectors or matrices. The first A rows of $X_t(a)$ specify what arm is being evaluated, the next $k_1$ rows correspond to the continuous predictors, followed by $k_2$ rows for the categorical predictors. The next $k_1\times A$ rows $i(a)\otimes X_c$ are the interaction terms between the continuous predictors and the arm (only rows corresponding to the arm a are non-zero), and the last $k_2\times A$ rows are the interaction terms between the categorical predictor and the arm chosen (all these rows are zero except one that is set to 1). The number of rows and model parameters is then $k=A+(k_1+k_2)(A+1)$. As an example, $k_1=5$ and $k_2=3$. Note that without the interaction terms, the optimal arm may be independent of the context. The model parameter dynamics may be set to $\theta_t=\theta_{t-1}+\omega_t$, where $\omega_t\sim N(0, W_t)$; $W_t$ has diagonal entries that are independent exponential random variables with rate $c_1=10^5$, and a correlation coefficient of 0.2 for its off-diagonal entries. A different matrix $W_t$ may be sampled at every round. The first user may arrive at t=1, and start the game by sampling $\theta_0$ from a zero-mean Gaussian with diagonal covariance matrix. The diagonal entries are independent samples from an exponential distribution with rate equal to 1. We initialize the mean and covariance estimates of $\theta_0$ as $m_0=0$ and $C_0=I$, where I is the identity matrix. At round t, starting from the mean $m_{t-1}$ and covariance $C_{t-1}$ estimates of the parameters, the mean at and covariance Rt of the parameters may be computed. One value of the model parameters may be sampled for each arm from the resulting prior distribution, and the context matrices $X_t(a)$ may be constructed for each arm. The context matrices and the parameter samples may be used to choose a(t) (which defines $X_t$) based on Thompson sampling. a(t) may be used to predict the response to obtain the round's reward, and the parameter estimates may be updated to obtain $m_t$ and covariance $C_t$ and start the next round.

The systems and techniques disclosed herein provide numerous advantages over other approaches to evaluating user interface options. For example, as compared to so-called "A/B testing," the presently disclosed techniques allow for the simultaneous exploration of numerous alternative user interface components and combinations of such alternatives. Furthermore, the disclosed techniques allow information to be gathered about potential contextual influences on an observation. For example, a certain user interface component, such as an image, may be associated with positive observations in some countries and associated with negative observations in other countries. The disclosed techniques employ online algorithms that facilitate dynamically adaptive models of expected user responses. In this way, observations that reflect changes in human behavior and user interests over time are automatically incorporated into the active model and are used for subsequent recommendations.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, embodiments of the present disclosure may be suited for any regression model, including regression models outside of the family of exponential regression models, such as linear regression models. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

Embodiments of the presently disclosed systems and methods described herein permit a media system, whether a download-based media system or a streaming media system enable probabilistic modeling using online algorithms that save computational resources and permit such modeling to be used in more scenarios that previously may not have had enough time to permit computation. Certain aspects of the present disclosure are set out the following numbered clauses:

1. A system of assessing deployments in a network-based media system, the system comprising: a data storage system for storing, the data storage system storing observation vectors, each observation vector being associated with an outcome indicator; and a processing device in communication with the data storage system to receive and store observation vectors and associated outcome indicators, wherein the processing device performs operations comprising: communicating with an endpoint device of a user to obtain information associated with the endpoint device; and transmitting an instance of a variable user interface to the endpoint device for presentation to the user via the endpoint device based on the stored observation vectors, the stored associated outcome indicators, and the obtained information associated with the endpoint device.

2. The system of clause 1, wherein the obtained information includes an Internet protocol (IP) address of the endpoint device, a date or a time of the communicating, a country associated with the IP address, a type of the endpoint device, an operating system of the endpoint device, an International Mobile Station Equipment Identity (IMEI) of the endpoint device, or an identifier of a browser executing on the endpoint device.

3. The system of any of clauses 1-2, wherein the instance of the variable user interface is selected, by the processing device, from a plurality of instances of the variable user interface, wherein each instance of the variable user interface includes at least one difference.

4. The system of any of clauses 1-3, wherein the instance of the variable user interface is selected based on the obtained information and a plurality of predictive models indicating a probabilistic relationship between the obtained information the plurality of instances of the variable user interface.

5. The system of any of clauses 1-4, wherein the transmitted instance of the variable user interface includes a first graphical element that is different from a second graphical element included in another instance of the variable user interface.

6. The system of any of clauses 1-5, wherein the first graphical element is a first portion of a first media item and the second graphical element is a second portion of the first media item.

7. The system of any of clauses 1-6, wherein the first graphical element is a portion of a first media item and the second graphical element is a portion of a second media item.

8. The system of any of clauses 1-7, wherein the processing device performs operations further comprising: assembling the obtained information into a new observation vector; determining an outcome of the transmitting of the instance of the variable user interface to the endpoint device; adding a new outcome indicator indicative of the determined outcome to the new observation vector; and storing the new observation vector in the data storage system.

9. The system of any of clauses 1-8, wherein the processing device performs operations further comprising: communicating with another endpoint device of another user to obtain new information associated with the other endpoint device; and transmitting another instance of the variable user interface to the other endpoint device for presentation to the other user via the other endpoint device based on the stored observation vectors including the new observation vector, and the obtained new information associated with the other endpoint device.

10. The system of any of clauses 1-9, wherein the processing device performs operations further comprising updating, based on the new observation vector, a plurality of predictive models indicating a probabilistic relationship between the obtained information and a plurality of instances of the variable user interface without reanalyzing the stored observation vectors.

11. The system of any of clauses 1-10, wherein the predictive models each include a mean parameter and a variance parameter.

12. The system of any of clauses 1-11, wherein the outcome indicators are binary and indicate whether or not the user of the endpoint device completes registration with the network-based media system.

12.1 A non-transitory computer-readable storage medium storing instructions that, when executed by one or more processing devices, cause the processing devices to perform any of the features recited in any of clauses 1-12.

12.2. A method that, when implemented by one or more processing devices, performs operations providing any of the features recited in any of clauses 9-14.

13. A system of assessing deployments in a network-based media system, the system comprising: means for obtaining information associated with an endpoint device of a user, the endpoint device being in communication with the network-based media system; means for generating models associated obtained information and outcomes; means for transmitting an instance of a variable user interface to the endpoint device, wherein the instance of the variable user interface is selected from a plurality of instances of the variable user interface based on the generated models; means for determining an outcome associated with the instance of the variable user interface being transmitted to the endpoint device, the outcome and the obtained information being included in an observation vector; and means for updating the generated models based on the determined outcome without recomputing previously obtained observation vectors.

14. The system of clause 13, wherein the means for obtaining information associated with an endpoint device of a user comprises means for obtaining information associated with another endpoint device of another user.

15. The system of any of clauses 13-14, wherein the means for transmitting the instance of the variable user interface to the endpoint device comprises means to select another instance of the variable user interface for transmission to another endpoint device based on the updated models.

15.1 A non-transitory computer-readable storage medium storing instructions that, when executed by one or more processing devices, cause the processing devices to perform any of the features recited in any of clauses 13-15.

15.2. A method that, when implemented by one or more processing devices, performs operations providing any of the features recited in any of clauses 13-15.

16. A method of assessing deployments in a network-based media system, the method comprising: communicating with a first endpoint device of a first user to obtain first information associated with the first endpoint device; transmitting an first instance of a variable user interface to the first endpoint device for presentation to the first user via the first endpoint device based on a plurality of predictive models associating obtained information to outcomes; communicating with a second endpoint device of a second user to obtain new information associated with the second endpoint device; and transmitting a second instance of the variable user interface to the second endpoint device for presentation to the second user via the second endpoint device based on the plurality of predictive models as updated in view of the first information and a first outcome associated with the first endpoint device.

17. The method of clause 16, wherein the obtained information includes an Internet protocol (IP) address of the endpoint device, a date or a time of the communicating, a country associated with the IP address, a type of the endpoint device, an operating system of the endpoint device, an International Mobile Station Equipment Identity (IMEI) of the endpoint device, or an identifier of a browser executing on the endpoint device.

18. The method of any of clauses 16-17, wherein the instance of the variable user interface is selected based on the obtained information and a plurality of predictive models indicating a probabilistic relationship between the obtained information and a plurality of instances of the variable user interface.

19. The method of any of clauses 16-18, further comprising updating, based on a new observation vector formed from the first information and the first outcome, a plurality of predictive models indicating a probabilistic relationship between the obtained information and a plurality of instances of the variable user interface without reanalyzing previously stored observation vectors.

20. The method of any of clauses 16-19, wherein the first and second instances of the variable user interface include a set of graphical elements displayed in different sequences.

Although the foregoing aspects of the present disclosure have been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A system of assessing deployments in a network-based media system, the system comprising:
    a data storage system for storing, the data storage system storing observation vectors, each observation vector being associated with an outcome indicator, and further storing a plurality of variable user interface instances; and
    a processing device in communication with the data storage system to receive and store observation vectors and associated outcome indicators, wherein the processing device performs operations comprising:
        communicating with an endpoint device of a user to obtain device-based information associated with the endpoint device; and
        transmitting at least one stored variable user interface instance to the endpoint device for presentation to the user via the endpoint device based on the stored observation vectors, the stored associated outcome indicators, and the obtained device-based information associated with the endpoint device.

2. The system of claim 1, wherein the obtained information includes an Internet protocol (IP) address of the endpoint device, a date or a time of the communicating, a country associated with the IP address, a type of the endpoint device, an operating system of the endpoint device, an International Mobile Station Equipment Identity (IMEI) of the endpoint device, or an identifier of a browser executing on the endpoint device.

3. The system of claim 1, wherein the instance of the variable user interface is selected, by the processing device, from a plurality of instances of the variable user interface, wherein each instance of the variable user interface includes at least one difference.

4. The system of claim 3, wherein the instance of the variable user interface is selected based on the obtained information and a plurality of predictive models indicating a probabilistic relationship between the obtained information and the plurality of instances of the variable user interface.

5. The system of claim 1, wherein the transmitted instance of the variable user interface includes a first graphical element that is different from a second graphical element included in another instance of the variable user interface.

6. The system of claim 5, wherein the first graphical element is a first portion of a first media item and the second graphical element is a second portion of the first media item.

7. The system of claim 5, wherein the first graphical element is a portion of a first media item and the second graphical element is a portion of a second media item.

8. The system of claim 1, wherein the processing device performs operations further comprising:
   assembling the obtained information into a new observation vector;
   determining an outcome of the transmitting of the instance of the variable user interface to the endpoint device;
   adding a new outcome indicator indicative of the determined outcome to the new observation vector; and
   storing the new observation vector in the data storage system.

9. The system of claim 8, wherein the processing device performs operations further comprising:
   communicating with another endpoint device of another user to obtain new information associated with the other endpoint device; and
   transmitting another instance of the variable user interface to the other endpoint device for presentation to the other user via the other endpoint device based on the stored observation vectors including the new observation vector, and the obtained new information associated with the other endpoint device.

10. The system of claim 8, wherein the processing device performs operations further comprising updating, based on the new observation vector, a plurality of predictive models indicating a probabilistic relationship between the obtained information and a plurality of instances of the variable user interface without reanalyzing the stored observation vectors.

11. The system of claim 10, wherein the predictive models each include a mean parameter and a variance parameter.

12. The system of claim 1, wherein the outcome indicators are binary and indicate whether or not the user of the endpoint device completes registration with the network-based media system.

13. A system of assessing deployments in a network-based media system, the system comprising:
   means for obtaining device-based information associated with an endpoint device of a user, the endpoint device being in communication with the network-based media system;
   means for generating models associated with obtained information and outcomes;
   means for transmitting an instance of a variable user interface to the endpoint device, the system including a plurality of stored variable user interface instances, wherein the instance of the variable user interface is selected from a plurality of instances of the variable user interface based on the generated models and based on the obtained device-based information;
   means for determining an outcome associated with the instance of the variable user interface being transmitted to the endpoint device, the outcome and the obtained information being included in an observation vector; and
   means for updating the generated models based on the determined outcome without recomputing previously obtained observation vectors.

14. The system of claim 13, wherein the means for obtaining information associated with an endpoint device of a user comprises means for obtaining information associated with another endpoint device of another user.

15. The system of claim 14, wherein the means for transmitting the instance of the variable user interface to the endpoint device comprises means to select another instance of the variable user interface for transmission to another endpoint device based on the updated models.

16. A method of assessing deployments in a network-based media system, the method comprising:
   communicating with a first endpoint device of a first user to obtain first device-based information associated with the first endpoint device, the network-based media system being configured to store a plurality of variable user interface instances;
   transmitting at least a first stored variable user interface instance to the first endpoint device for presentation to the first user via the first endpoint device based on a plurality of predictive models associating obtained information to outcomes and based on the obtained device-based information;
   communicating with a second endpoint device of a second user to obtain new device-based information associated with the second endpoint device; and
   transmitting at least a second stored variable user interface instance to the second endpoint device for presentation to the second user via the second endpoint device based on the plurality of predictive models as updated in view of the first information and a first outcome associated with the first endpoint device.

17. The method of claim 16, wherein the obtained information includes an Internet protocol (IP) address of the endpoint device, a date or a time of the communicating, a country associated with the IP address, a type of the endpoint device, an operating system of the endpoint device, an International Mobile Station Equipment Identity (IMEI) of the endpoint device, or an identifier of a browser executing on the endpoint device.

18. The method of claim 16, wherein the instance of the variable user interface is selected based on the obtained information and a plurality of predictive models indicating a probabilistic relationship between the obtained information and a plurality of instances of the variable user interface.

19. The method of claim 16, further comprising updating, based on a new observation vector formed from the first information and the first outcome, a plurality of predictive models indicating a probabilistic relationship between the obtained information and a plurality of instances of the variable user interface without reanalyzing previously stored observation vectors.

20. The method of claim 16, wherein the first and second instances of the variable user interface include a set of graphical elements displayed in different sequences.

* * * * *